(12) United States Patent
Craze (10) Patent No.: US 7,494,313 B2
(45) Date of Patent: Feb. 24, 2009

(54) WHEEL LIFT THAT MAY BE RAPIDLY DISASSEMBLED AND CONVERTED

(75) Inventor: Jean Paul Craze, Chesapeake, VA (US)

(73) Assignee: Miller Industries Towing Equipment Inc., Ooltewah, TN (US)

(*) Notice: Subject to any disclaimer, the term of this patent is extended or adjusted under 35 U.S.C. 154(b) by 218 days.

(21) Appl. No.: 10/719,438

(22) Filed: Nov. 21, 2003

(65) Prior Publication Data

US 2005/0111949 A1 May 26, 2005

(51) Int. Cl.
*B60P 3/12* (2006.01)
(52) U.S. Cl. ...................................... 414/563
(58) Field of Classification Search ................ 414/463; 280/402
See application file for complete search history.

(56) References Cited

U.S. PATENT DOCUMENTS

| 4,384,817 | A | * | 5/1983 | Peterson ..................... 414/563 |
| 4,564,207 | A | | 1/1986 | Russ et al. |
| 4,637,623 | A | | 1/1987 | Bubik |
| 4,678,392 | A | | 7/1987 | Capers et al. |
| 4,679,978 | A | | 7/1987 | Holmes et al. |
| 4,691,617 | A | * | 9/1987 | Purkott ..................... 91/167 R |
| 4,737,066 | A | | 4/1988 | Allison, Jr. et al. |
| 4,798,509 | A | | 1/1989 | Bubik |
| 4,836,737 | A | | 6/1989 | Holmes et al. |
| 4,875,822 | A | | 10/1989 | Nespor |
| 4,890,972 | A | | 1/1990 | Nekola |
| 4,958,980 | A | | 9/1990 | Holmes et al. |
| 4,986,720 | A | | 1/1991 | Holmes et al. |
| 4,993,909 | A | | 2/1991 | Hamman |
| 5,013,209 | A | | 5/1991 | DeMichele et al. |
| 5,061,147 | A | | 10/1991 | Nespor |
| 5,575,606 | A | * | 11/1996 | Kiefer et al. ................ 414/563 |
| 5,692,871 | A | | 12/1997 | Nespor |
| 5,909,996 | A | | 6/1999 | Cowell |
| 5,954,160 | A | | 9/1999 | Wells et al. |
| 6,139,250 | A | * | 10/2000 | Nolasco ..................... 414/563 |
| 6,315,515 | B1 | | 11/2001 | Young et al. |
| 6,447,239 | B2 | | 9/2002 | Young et al. |
| 7,153,082 | B2 | * | 12/2006 | Nolasco ..................... 414/563 |
| 2004/0081542 | A1 | * | 4/2004 | Nolasco et al. ............. 414/563 |
| 2004/0105746 | A1 | * | 6/2004 | Nolasco ..................... 414/563 |
| 2006/0045707 | A1 | * | 3/2006 | Nolasco et al. ............. 414/563 |

* cited by examiner

*Primary Examiner*—James Keenan
(74) *Attorney, Agent, or Firm*—Michael P. Mazza

(57) ABSTRACT

A self-loading wheel lift with automatically powered wheel support members, such as L-arms, for engaging the wheels of a vehicle to be towed. The wheel lift may be rapidly disassembled in the field and converted to alternating towing assemblies such as tool bars employing frame fork attachments, hook ends, slings, pintle hooks, fifth-wheel plates, king pins, etc.

20 Claims, 11 Drawing Sheets

WHEEL LIFT THAT MAY BE RAPIDLY DISASSEMBLED AND CONVERTED

BACKGROUND OF THE INVENTION

The present invention generally relates to devices for lifting and towing vehicles by a pair of the vehicle wheels, known as wheel lifts. More particularly, the invention is directed to a self-loading wheel lift that may be rapidly disassembled for transportation or repair and/or rapidly converted or transformed for other applications.

Commonly assigned U.S. Pat. Nos. 4,637,623 and 4,798,509 to Alm, each entitled "Towing Apparatus," and U.S. Pat. No. 4,836,737 to Holmes entitled "Wheel Lift Tow Assembly," each disclosing known wheel lift assemblies, as well as U.S. Pat. No. 4,564,207 to Russ et al., entitled "Hydraulic Wheel Lift System For Tow Vehicles," are each hereby incorporated by reference in their entirety into this application.

For years the standard hydraulic self-loading wheel lift, such as depicted in U.S. Pat. No. 4,564,207 to Russ et al. has enjoyed a specific usage in the towing industry. While capable of automatically loading automobiles in seconds with ease and permitting operators to remain in the safe environment of their cab, self-loading wheel lifts can only load those automobiles possessing tires. Such wheel lifts are also limited by their inability to handle the weight of larger trucks and the like. The typical assembly of such wheel lifts includes a cross bar roughly 80 inches long for capturing the towed vehicle's tires. Two wheel support members such as L-shaped arms may be pivotally attached to the cross bar, swinging from inside and then outwardly to capture a towed vehicle's tires. Hydraulic cylinders, for example, may power L-arm movement. In the past, the wheel support members of self-loading wheel lifts have not been designed to be removed from the cross bar.

Conventional wheel lifts are also an industry standard and have been in the towing industry for years. These wheel lifts, exemplified by those disclosed in U.S. Pat. Nos. 4,637,623, 4,798,509 and 4,836,737, are more versatile than self-loading wheel lifts in some ways, as they are capable of loading vehicles with or without tires, as well as heavier vehicles such as heavy trucks. However, the process required to engage a towed vehicle using a conventional wheel lift is considerably longer than with a self-loading wheel lift, and may take ten minutes or longer. In addition, the tow truck operator must exit the cab to manually place the L-arms or other tow-engaging attachments, exposing him to the elements and traffic. The typical assembly of a conventional wheel lift includes a cross bar roughly 40-60 inches in length. Two shoes are slid over opposing ends of the cross bar, and pivoting collars may be mounted to the shoes. The collars engage L-arms that are manually placed to engage the tires or other locations on a towed vehicle. The L-arms are designed to engage points on the towed vehicle from the outside in, limiting their ability to engage tires located adjacent curbs, for example. While some conventional wheel lifts may be converted from using L-arms to a tool bar, the conversion has been manual and time-consuming, and the L-arms were unable to swing from the inside out, limiting their application.

Self-loading or conventional wheel lift assemblies have not been previously designed, to applicant's knowledge, to permit rapid disassembly in the field or to allow rapid conversion to an alternate towing mechanism. Often, the cross bar of wheel lift-type tow mechanisms includes shoes or brackets that are welded to the ends of the cross bars. Additionally, the presence of permanently attached powering mechanisms such as hydraulic cylinders may render it difficult and time-consuming to remove wheel support members and/or receivers from the cross bar. In short, it is not believed that self-loading wheel lifts have been designed with the ability to rapidly convert or transform the wheel lift device into an alternate towing mechanism, such as a tool bar or frame fork attachment.

Accordingly, it would be advantageous to provide a self-loading wheel lift that overcomes the current disadvantages of such wheel lifts, while providing new advantages.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Rapidly" and "quickly" as applied to disassembly each mean the ability to remove the (e.g.) wheel lift from the cross bar in the field, and to reassemble an alternate towing device in the field, within a matter of a few minutes.

"Self-loading wheel lift" refers to a wheel lift capable of engaging and lifting a towed vehicle without the necessity of manually placing wheel support members to engage the towed vehicle.

"Tool bar" means a round or square tube connected to the rear of a towing vehicle and able to receive various attachments to effectuate or facilitate towing a vehicle such as but not limited to hook ends, frame forks, slings, pintle hooks, fifth-wheel plates, king pins, etc.

"Wheel lift" means any device designed to lift and tow vehicles by attachment to and sole or substantial support by the wheels of the towed vehicle.

SUMMARY OF THE INVENTION

The objects mentioned above, as well as other objects, are solved by the present invention, which overcomes disadvantages of prior wheel lifts, while providing new advantages not believed associated with such devices, including those advantages listed above as well as other advantages as well.

The self-loading wheel lift of the present invention may be rapidly disassembled and converted or transformed into an alternate towing mechanism. In one embodiment, the receiving tubes and L-arms may be slid off opposing ends of the cross bar as one unit, allowing the operator/driver of the towing vehicle to rapidly convert the device from a self-loading wheel lift to a towing mechanism having rearwardly engaging tool bar or frame fork attachment in a matter of seconds. This allows the tow truck the flexibility to tow heavier vehicles, while also retaining the abilities of a self-loading wheel lift whose L-arms can swing from the inside out using (e.g.) hydraulic cylinders.

In one preferred embodiment, an apparatus is provided for use in a lifting and towing vehicle. A boom may extend rearwardly from the lifting and towing vehicle, and a powered actuator, such as one or more hydraulic cylinders, may be used to move the boom into different angular orientations relative to horizontal. A transverse support beam or cross bar may be connected to the end of the boom. The cross bar may be positioned below a towable vehicle, and includes two opposing end portions. The end portions may be horizontally moveable relative to the cross bar, and each end is capable of being positioned adjacent to one of a pair of wheels on the towable vehicle. Two receivers are each removably connected to opposing end portions of the cross bar. Each receiver carries a wheel support member, which may but need not be an L-arm having an elongated arm and a wheel engaging end such as a wheel retainer. The wheel support members are capable of being swung back and forth in a generally horizontal plane. One or more powering mechanisms, such as hydraulic cylinders, pneumatic cylinders, electric motors/solenoids, etc. preferably drive movement of the wheel support members in the generally horizontal plane. The receivers with the wheel support members form a wheel lift apparatus which may be rapidly disassembled from the cross bar in the field to permit conversion from the wheel lift apparatus to an alternate towing apparatus, such as but not limited to a tool bar employing frame fork attachments, hook ends, slings, pintle hooks, fifth-wheel plates, king pins, etc.

Preferably, the wheel support members may be rotated in a generally horizontal plane from a position inside the tires of the towable vehicle to a wheel engaging position.

Mechanisms, such as cam locks, bolts, pins, wire, etc. may be employed to facilitate rapid connection and decoupling of each wheel lift apparatus (i.e., the receiver/wheel support member set) from the cross bar. For example, a cam lock with a rotatable handle and a spring-loaded plunger pin may be used to quickly connect and disconnect the receiver from the cross bar. The cylinder rod connection point may also need to be connected or disconnected as well. For this purpose, the distal ends of each cylinder rod may include an aperture for use in coupling each cylinder rod to a receiver. Alternatively, each cylinder rod may consist of two component rods that are connected to each other, e.g., one may be slidable within the other and they be attached using a removable locking pin allowing rapid field disassembly. Preferably, the wheel support members are pivotally attached to the receivers using a pivot pin, for example, which may be prevented from accidental disengagement by use of a retaining mechanism, such as a counter-sunk screw. Parallel plates, lying above and below the cross bar, may but need not be used to facilitate attachment of each wheel support member to the receivers.

In an alternative embodiment of the present invention, a method is provided for use in lifting and towing vehicle. A boom carrying a transverse support beam or cross bar may first be positioned adjacent a towable vehicle. The support beam may be positioned below the towable vehicle. The support beam may include two opposing end portions mounted by removably connected receivers. Each receiver may carry or support a wheel support member, which may include an elongated arm and a wheel engaging member. The wheel support members may be pivotally connected to the receivers and may be capable of being swung back and forth in a generally horizontal plane. The receivers and wheel support members together form the wheel lift apparatus. Next, a wheel engaging portion of each wheel support member may be positioned adjacent and between each of a pair of wheels of the towable vehicle. The wheel engaging portions may then be caused to rotate outwardly toward the wheels of the towable vehicle into a wheel engaging position. One or more powering mechanisms, such as hydraulic cylinders, may be used to drive movement of the wheel support members in the generally horizontal plane. The now wheel-engaged and towable vehicle may now be lifted and towed to a desired location, where the towable vehicle may be disengaged. If desirable, the lifting and towing vehicle may be converted in the field by rapidly disassembling the wheel lift apparatus from the support bar and replacing it with an alternate towing apparatus, such as a tool bar employing various types of attachments.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings. The drawings illustrate currently preferred embodiments of the present invention. As further explained below, it will be understood that other embodiments, not shown in the drawings, also fall within the spirit and scope of the invention.

DETAILED DESCRIPTION OF THE PREFERRED EMBODIMENTS

Set forth below is a description of what are currently believed to be the preferred embodiments and/or best examples of the invention claimed. Future and present alternatives and modifications to these preferred embodiments are contemplated. Any alternatives or modifications which make insubstantial changes in function, in purpose, in structure or in result are intended to be covered by the claims of this patent.

Figure 1:
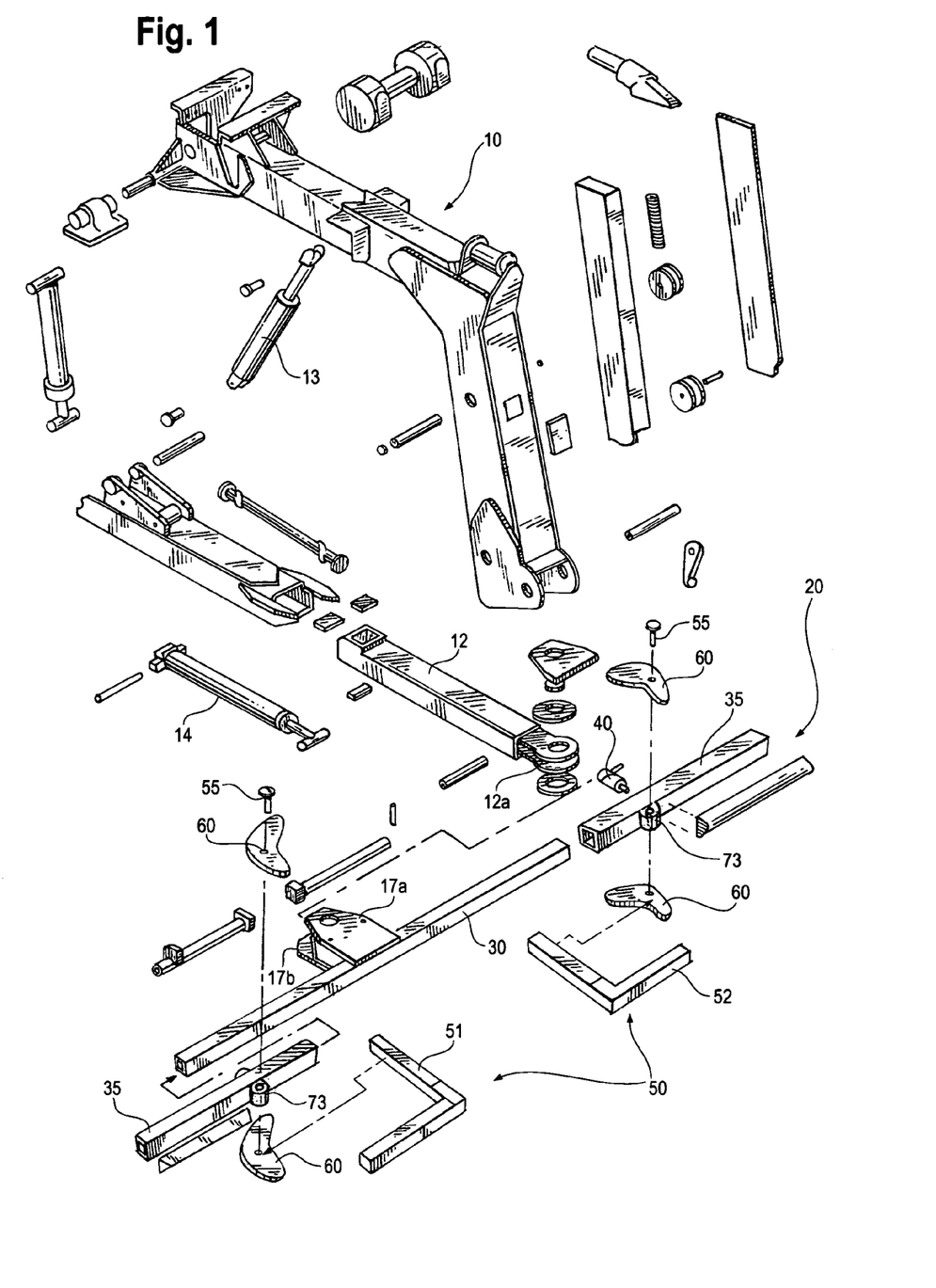
FIG. 1 is a perspective, parts view of a self-loading wheel lift according to the present invention together with a known towing boom assembly that may be used with it.
Figure 2:
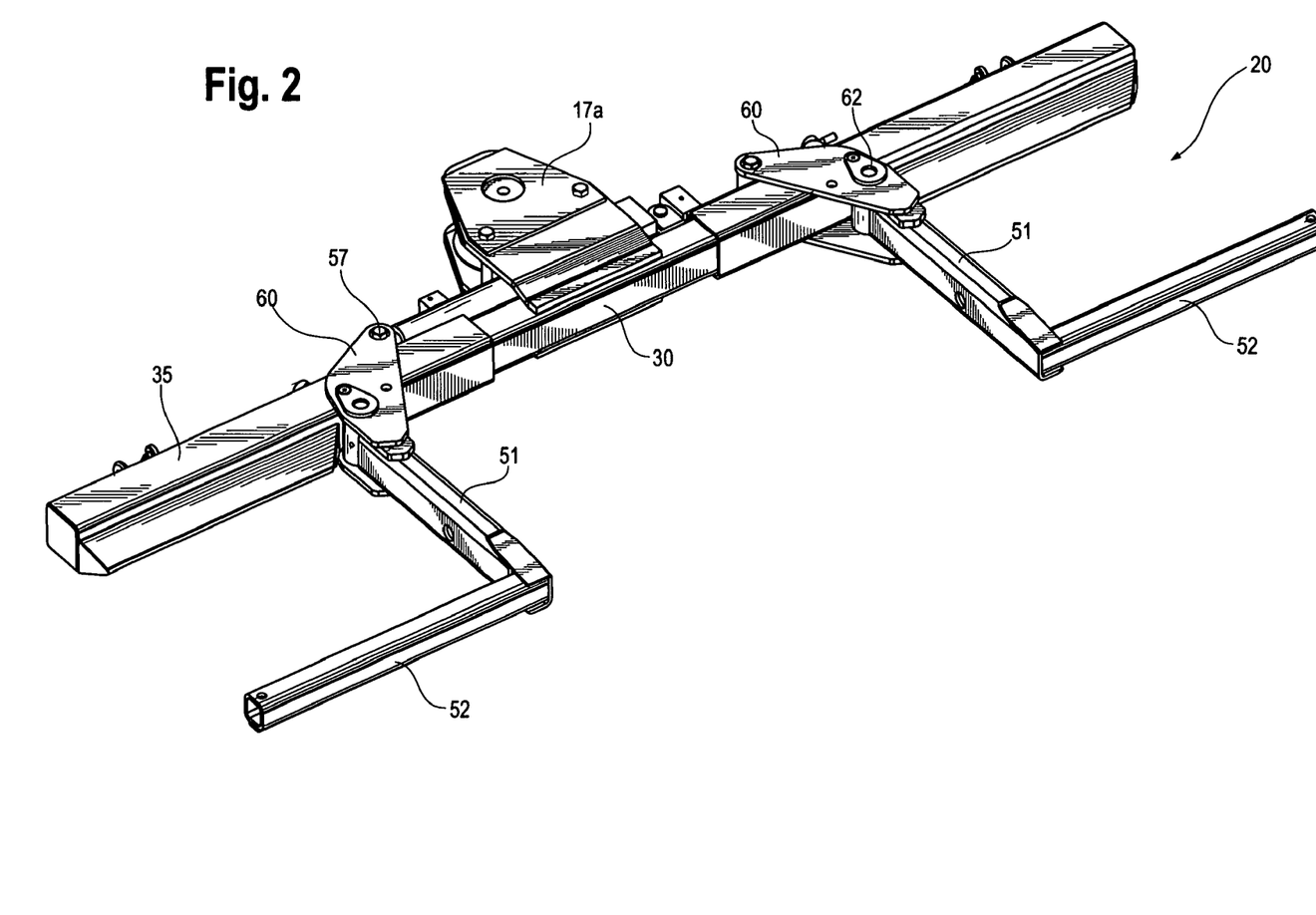
FIGS. 2 and 3 are front and rear perspective views of a preferred embodiment of the self-loading wheel lift of the present invention.

Referring first to FIG. 1, a preferred embodiment of the self-loading wheel lift of the present invention is shown, designated generally with the reference numeral 20. Wheel lift 20 may but need not be associated with a boom assembly extending rearwardly from a towing vehicle as shown in FIG. 1, which boom assembly may include articulating, hydraulicly powered boom 10, support beam 12, hydraulic boom cylinders 13, 14, and transverse support or cross bar 30, which may be rectangular or curved in cross-section. A distal end 12a of support beam 12 may be pivotally attached to cross bar 30 at aperture 16 within plates 17a, 17b via a pin 89 (FIG. 6).

Wheel lift apparatus 20 may be attached to cross bar 30 using receivers, such as receiving tubes 35, which may be slid over opposing ends of cross bar 30 as shown, and fastened in place using cam-lock 40 and/or other mechanisms, as further described below. Wheel lift 20 may include wheel support members for engaging the tires of a vehicle to be towed, such as a pair of jaws or L-arms 50. Each L-arm 50 may include a leg 51, which may be generally perpendicular to cross bar 30, and a wheel engaging leg 52 which may be generally parallel to the cross bar.

Figure 3:
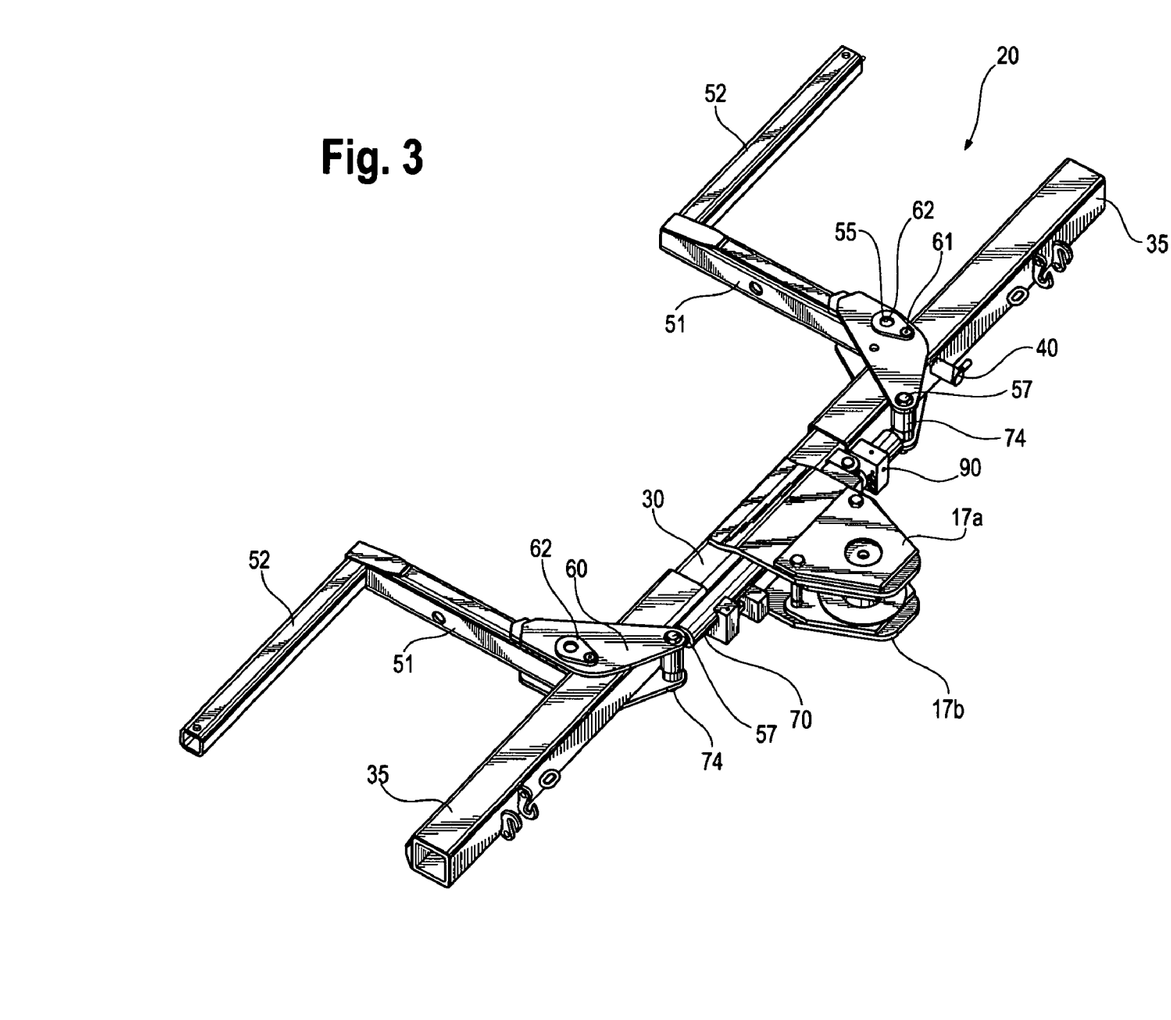
Figure 4:
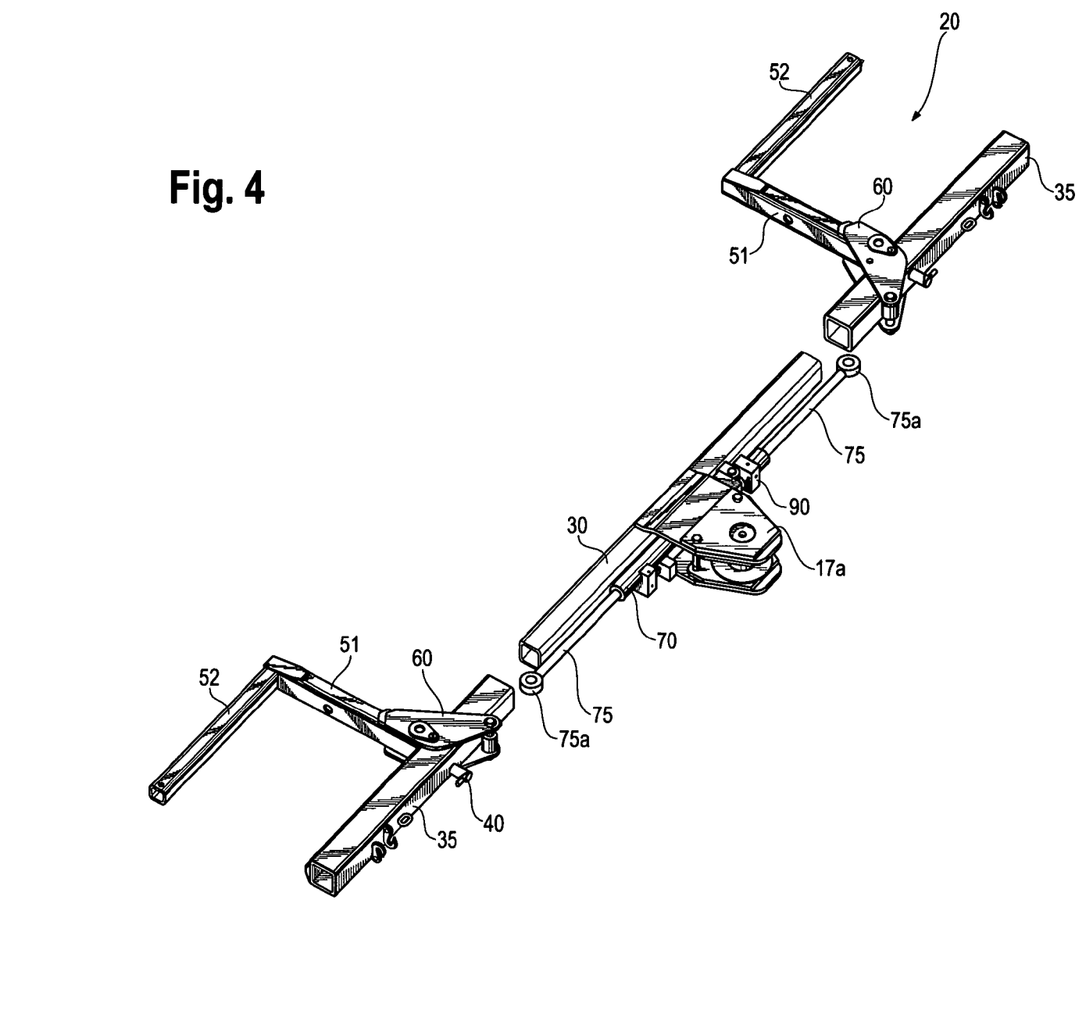
FIG. 4 is a perspective view of the wheel lift shown in FIGS. 2 and 3, showing the receiver/L-arm units disassembled from the cross bar.
Figure 5:
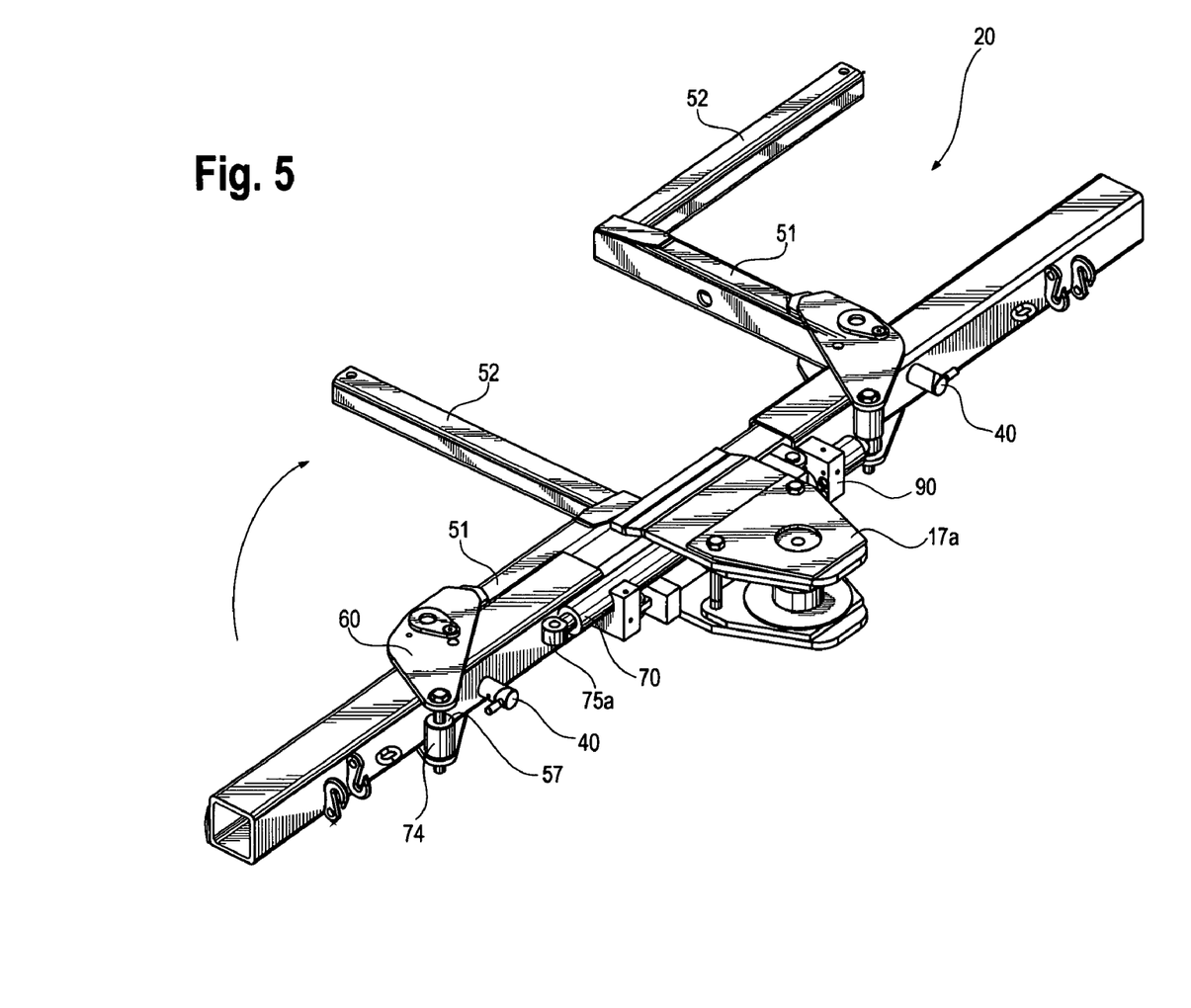
FIG. 5 is a perspective view similar to FIG. 3 showing rotation of one of the L-arms.
Figure 6:
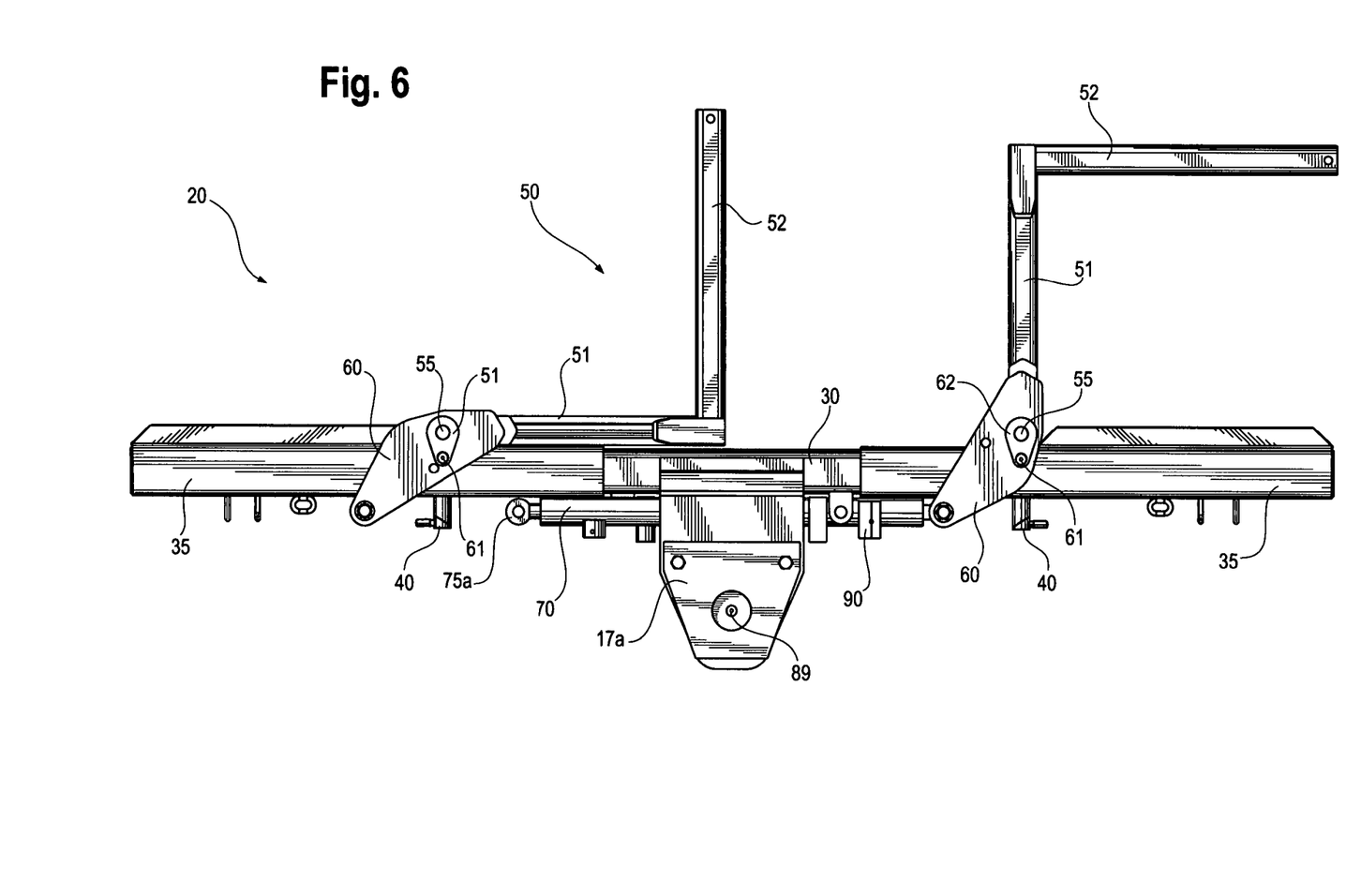
FIG. 6 is a planar, cross-sectional view similar to FIG. 5.
Figure 7:
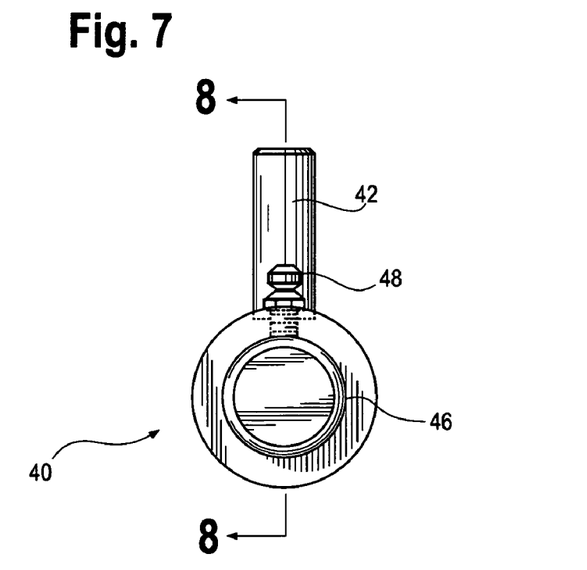
FIG. 7 is a front view of a cam lock.
Figure 8:
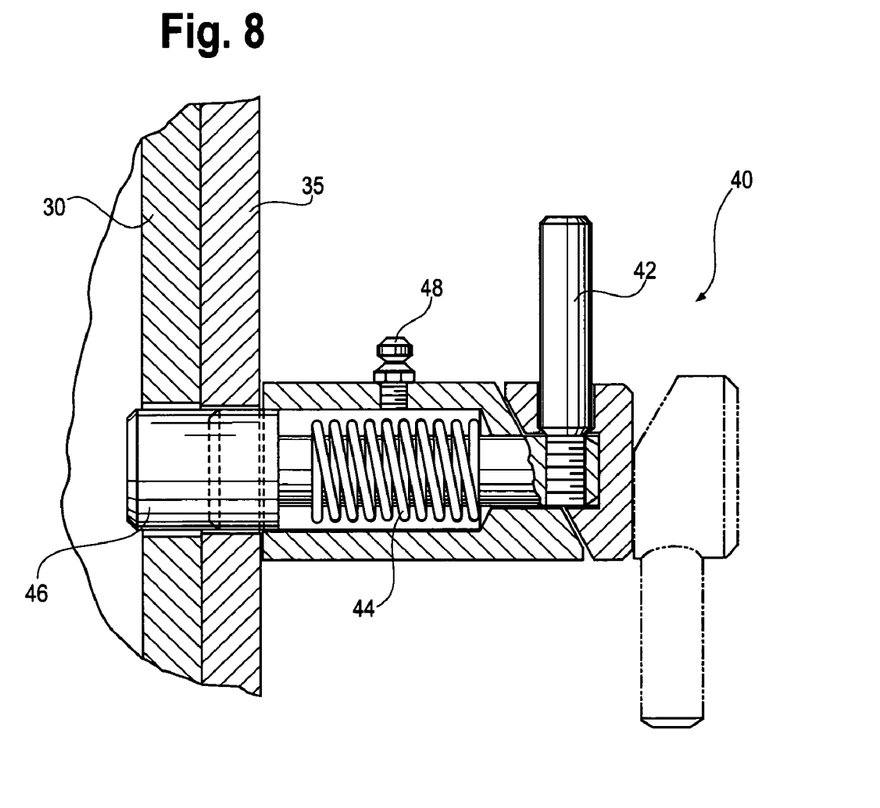
FIG. 8 is a cross-sectional view along reference lines 8-8 of FIG. 7.
Figure 9:
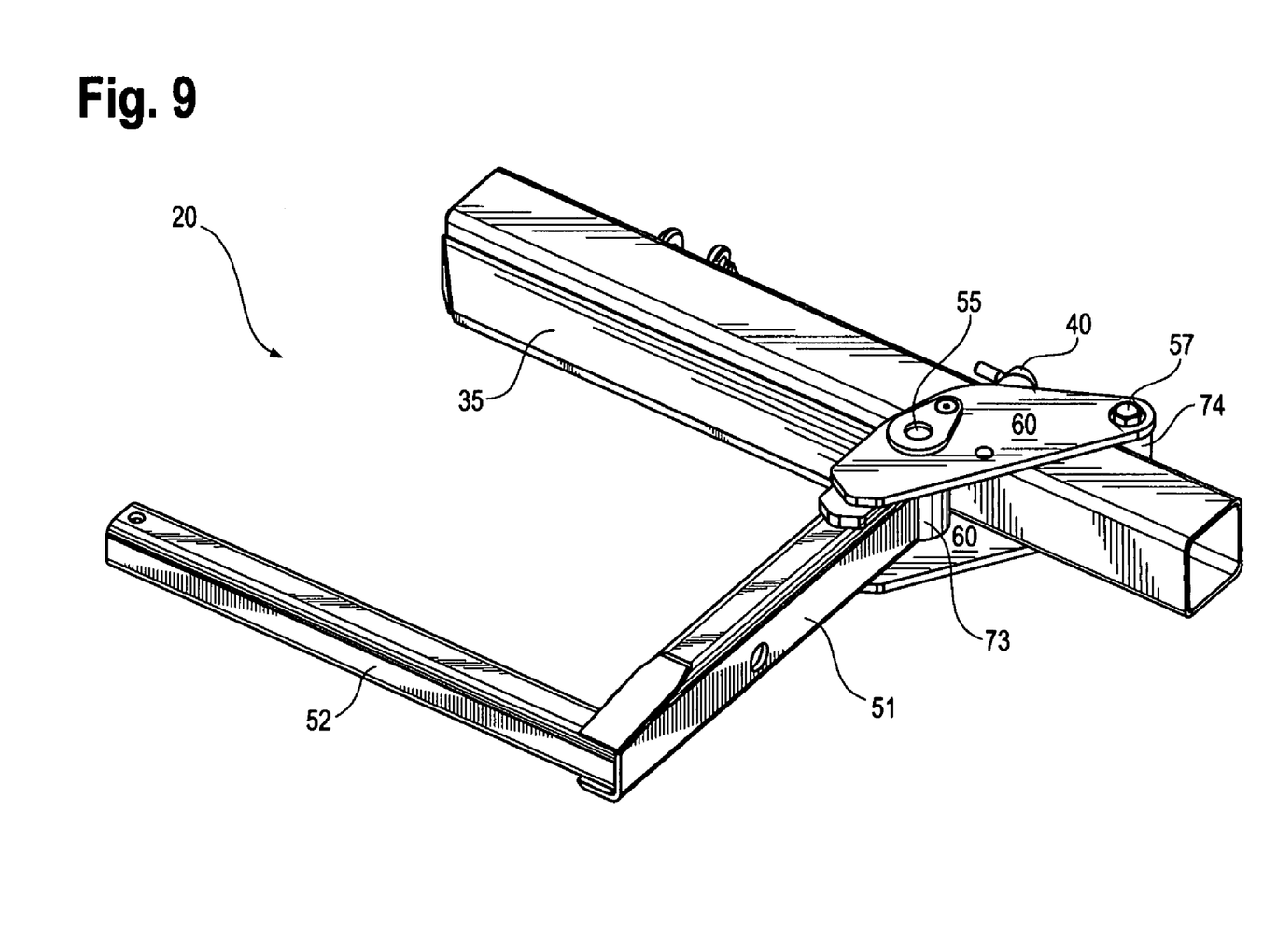
FIG. 9 is a partial planar perspective view of a receiver/L-arm set.
Figure 10:
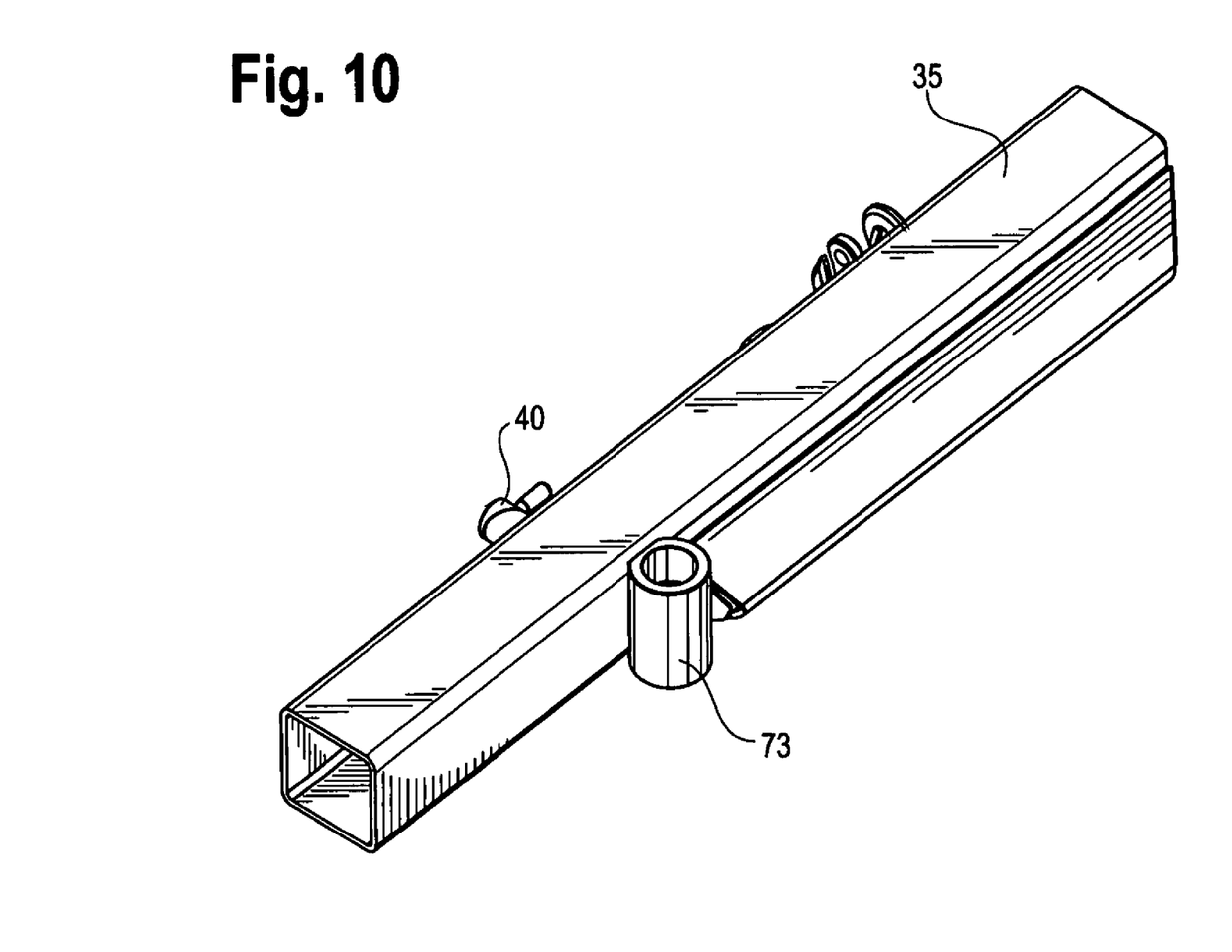
FIG. 10 is a planar perspective view of a receiver.

L-arms 50 are preferably pivotally mounted to receivers 35 to allow the L-arms to swivel in a horizontal plane, as best shown in FIGS. 5 and 6. In the embodiment shown in the drawings, for example, the L-arms may be each attached and pivot about main pivot pin 55 (see, e.g., FIGS. 1, 3 and 9-11). Pin 55 also passes through plates 60, which lie on adjacent sides of receivers 35. On the opposite, front side of the receivers, plates 60 maybe pivotally attached to cylinder rods 75 via pin 57 located within bushing 74 (see, e.g., FIG. 3 and 11). Retaining screw 61, such as counter-sunk screw, ensures pivot 55 remains in place unless removed, while tear drop retaining plate 62 (which rotates with the L-arm) may be welded to main pivot pin 55 (see, e.g., FIG. 9).

Figure 11:
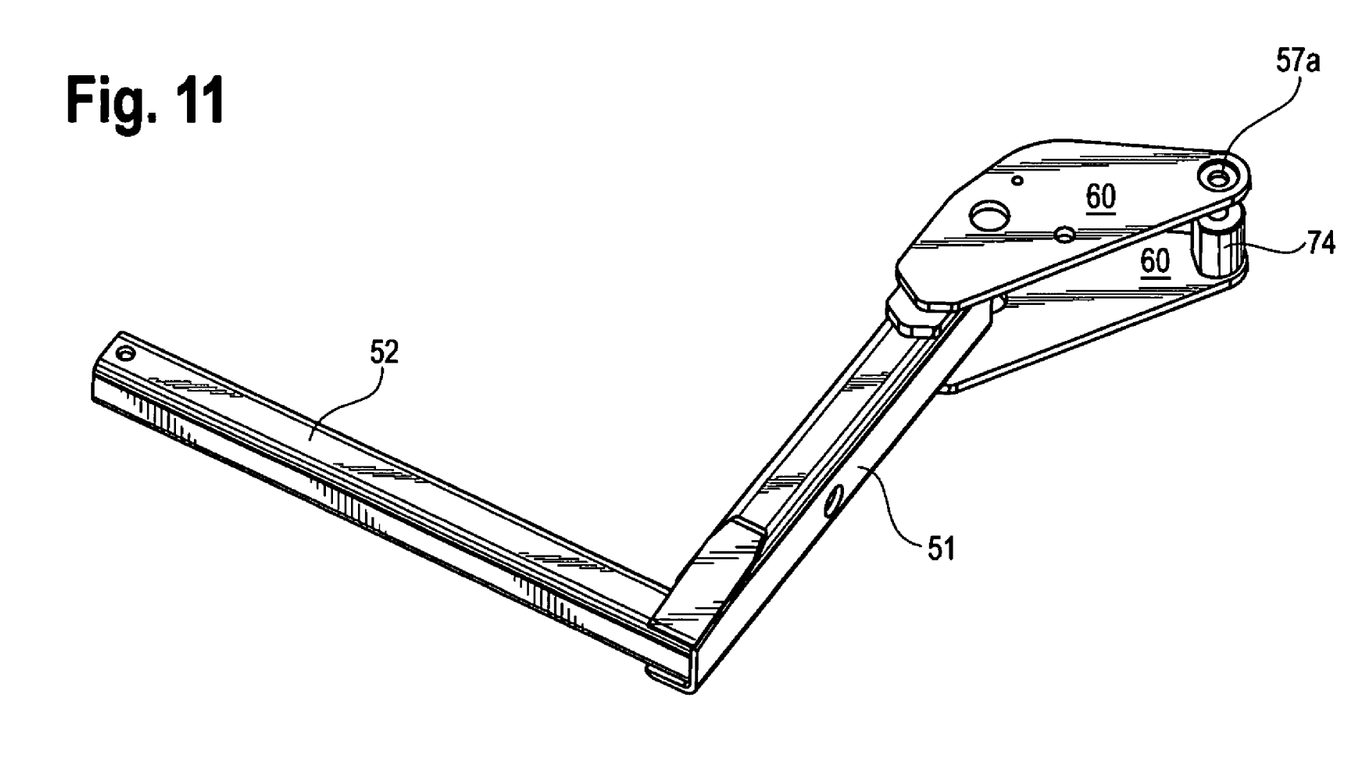
FIG. 11 is a perspective view of an L-arm.

Referring now to FIGS. 3-6, for example, hydraulic cylinder 70 has a cylinder rod 75 which is attached to pin 57. Pin 57 may be located within aperture 57a and bushing 74 (FIG. 11). In this manner, as rod 75 moves up and down within cylinder 70, the corresponding L-arm is caused to rotate or swivel in a horizontal plane parallel to the cross bar, as shown in FIGS. 5 and 6.

Referring to FIGS. 2-6, in one embodiment shown in the drawings, cylinder rods 75 terminate at a distal end in apertures 75a, which may be pivotally connected to pin 57. Alternatively, and not shown in the drawings, each cylinder rod 75 may consist of two rods; the distal end of a cylinder rod may be bolted to pin 57, while the other near end of that cylinder rod may be designed to slide within its mating end, with a pin running through the connection point of the rods to rigidly attached them. It will be understood that other attachment mechanisms may be provided, while retaining the quick-connect/disconnect features of the present invention which allow the receiver/L-arm unit to be rapidly assembled and disassembled from the cross bar in the field.

Referring now to FIGS. 7-10, for example, cam lock 40 is shown. Cam lock 40 is designed to allow rapid connection and disassembly of receivers 35 from cross bar 30. In the embodiment shown, cam lock 40 may include handle 42, spring 44 and plunger pin 46. When handle 40 is twisted or rotated, spring 44 may be compressed, pulling plunger 46 out of an aperture in the cross bar tube. Pin 48 may be removed to provide grease to the cam lock assembly, or grease may be simply provided around it and within the cam lock. Again, alternative mechanisms may be provided to lock and unlock the receivers from the cross bar, such as bolts, pins, wires, etc.

Referring to FIGS. 3-6, a counterbalance valve 90 may be used as is well known, and located on hydraulic cylinder 70 to act as a safety valve. Thus, if during a towing operation the hoses to cylinder 70 break, for example, safety valve 90 will ensure that the L-arms remain rigidly locked in place, to prevent loss of the towed vehicle during towing engagement or transportation.

Figure 12:
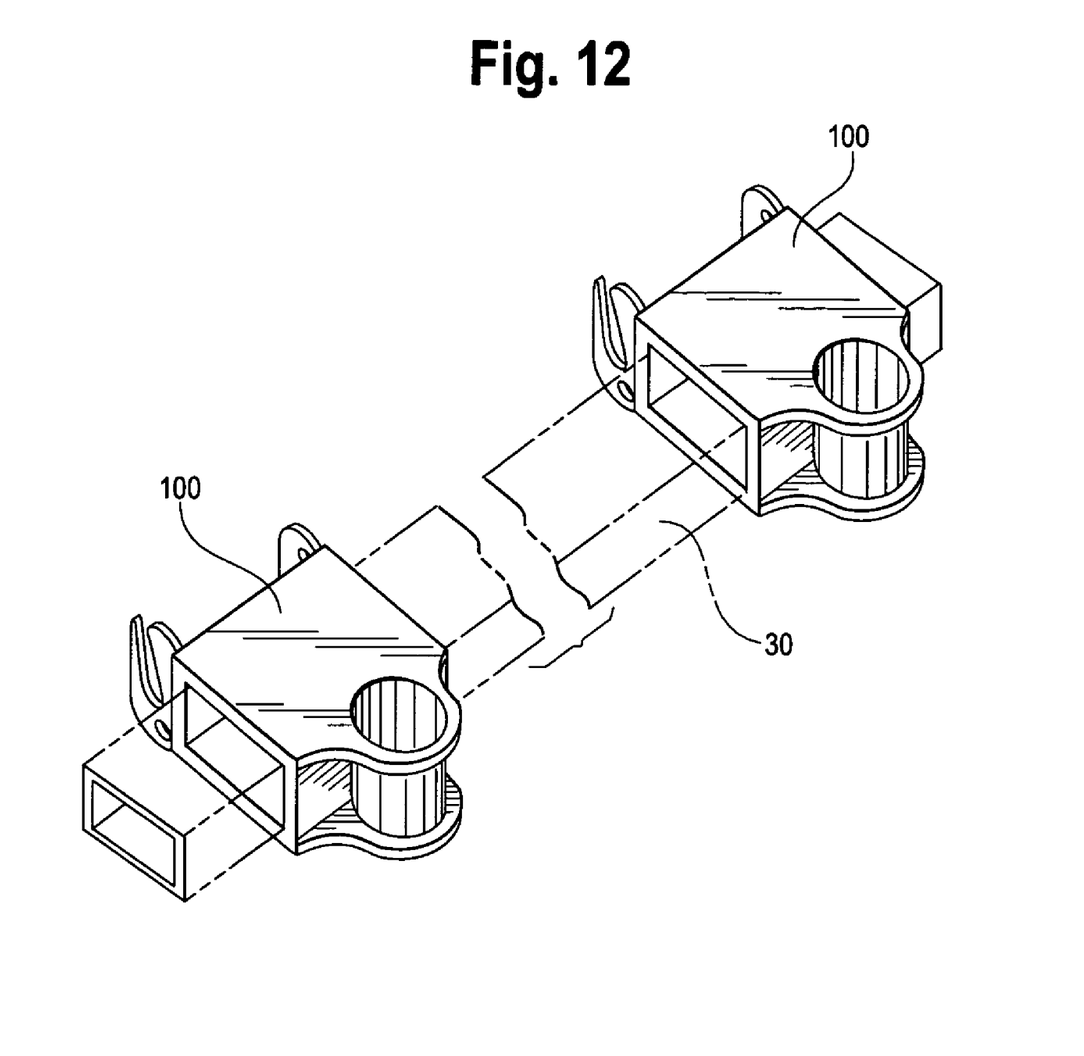
FIG. 12 is a rear perspective view of a cross bar with frame fork attachments.

It will now be understood that wheel lift 20 may be rapidly assembled and disassembled in the field such that receivers 35, carrying L-arms 50, may be removed from cross bar 30, and replacement towing mechanisms may then be attached to cross bar 30 via a tool bar, for example. For example, referring to FIG. 12, frame fork holders 100 may then be slid onto opposing ends of cross bar 30 and rigidly attached to the cross bar in any manner well known in the art, to accommodate the engagement and towing of larger vehicles or trucks, for example. Other towing attachments may also be used, such as but not limited to hook ends, frame forks, slings, pintle hooks, fifth-wheel plates, king pins, etc.

It will be understood that self-loading wheel lifts with alternative functions may be designed according to the principles of the present invention. For example, movement of wheel support members may be powered using alternative mechanisms other than hydraulic cylinders, such as pneumatic cylinders, electric motors/solenoids, chains, rope, etc. Preferably, however, self-loading wheel lifts according to the present invention retain the ability to engage a towed vehicle's wheel from the inside out, and retain the rapid disassembly and conversion capability.

The above description is not intended to limit the meaning of the words used in the following claims that define the invention. Rather, it is contemplated that future modifications in structure, function or result will exist that are not substantial changes and that all such insubstantial changes are intended to be covered by the following claims.

I claim:

1. An apparatus for use in a lifting and towing vehicle, comprising:
   a transverse cross bar connected to the end of a boom located rearwardly of the lifting and towing vehicle, the cross bar being positionable below a towable vehicle, and the cross bar having two opposing end portions positionable adjacent to one of a pair of wheels on the towable vehicle;
   two slidable receivers each removably connected to the opposing end portions of the cross bar, each receiver having an engagement mechanism comprising a handle with a spring-loaded plunger pin mounted on the receiver and facilitating connection and decoupling of the receivers from the cross bar, the receivers also each carrying a wheel support member having an elongated arm and a wheel retainer, and the wheel support members being capable of being swung back and forth in a generally horizontal plane;
   one or more hydraulic cylinders connected to the wheel support members for driving movement of the wheel support members in the generally horizontal plane, wherein the one or more hydraulic cylinders communicate with cylinder rods that are removably attached to the receivers using removable pivot means which pass through movable plates connecting the cylinder rods to the elongated arms;
   the receivers with the wheel support members together comprising a wheel lift apparatus, whereby the wheel lift apparatus may be directly removed from the cross bar and from the hydraulic cylinders in the field, including by sliding the receivers over the crossbar and thereby removing them from the crossbar, using the removable pivot means and the engagement mechanism to permit in-the-field conversion from the wheel lift apparatus to an alternate towing apparatus attachable to the crossbar.

2. The apparatus of claim 1, wherein the apparatus comprises a self-loading wheel lift.

3. The apparatus of claim 1, wherein the alternate towing apparatus comprises a tow bar.

4. The apparatus of claim 3, wherein the tow bar includes frame fork attachments.

5. The apparatus of claim 1, wherein the elongated arms may be swung in the horizontal plane from a position inside tires of the towable vehicle to a wheel engaging position.

6. The apparatus of claim 1, wherein the engagement mechanism comprises a cam lock and the handle is a rotatable handle.

7. The apparatus of claim 1, wherein a distal end of each cylinder rod includes an aperture for use in coupling each cylinder rod to a receiver.

8. The apparatus of claim 1, wherein the removable pivot means comprises a removable locking pin.

9. The apparatus of claim 1, wherein each wheel support member is pivotally attached to a receiver using a pivot pin.

10. The apparatus of claim 9, wherein the pivot pin is prevented from being disengaged by a retaining screw.

11. The apparatus of claim 1, wherein the attachment of each wheel support member to each receiver comprises the movable plates, one plate lying above the cross bar and one plate lying below the cross bar.

12. The apparatus of claim 1, wherein each wheel support member comprises an L-arm.

13. The apparatus of claim 1, wherein the boom comprises an extensible and retractable boom, and further comprising a hydraulically powered actuator to move the boom into different angular orientations relative to horizontal.

14. The apparatus of claim 1, wherein the slidable receivers of the cross bar are horizontally moveable relative to the rest of the cross bar.

15. A method for using a lifting and towing vehicle, comprising the steps of:

positioning a boom adjacent a towable vehicle, the boom carrying a transverse cross bar;

positioning the transverse cross bar below a towable vehicle, the cross bar having two opposing end portions each supporting removable and slidable receivers, each receiver having an engagement mechanism comprising a handle with a spring-loaded plunger pin mounted on the receiver and facilitating connection and decoupling of the receiver from the cross bar and carrying a wheel support member, the wheel support members being capable of being swung back and forth in a generally horizontal plane, the receivers and wheel support members comprising a wheel lift apparatus;

wherein one or more powering mechanisms are removably attached to the receivers using only removable pivot means which pass through movable plates connecting the powering mechanisms to the wheel support members;

positioning a wheel engaging portion of each wheel support member adjacent and between each of a pair of wheels of the towable vehicle, and then causing the wheel engaging portion to rotate outwardly toward the wheels of the towable vehicle into a wheel engaging position, wherein the one or more powering mechanisms drive movement of the wheel support members in the generally horizontal plane;

lifting and towing the now wheel-engaged and towable vehicle to a desired location; and disengaging the towable vehicle, and converting the lifting and towing vehicle in the field by disassembling the wheel lift apparatus from the cross bar in the field by sliding the receivers along the crossbar and thereby removing the receivers from the crossbar, using the engagement mechanisms and the removable pivot means, and replacing the wheel lift apparatus with an alternate towing apparatus.

16. The method of claim 15, wherein the one or more powering mechanisms comprise hydraulic cylinders.

17. The method of claim 16, wherein the hydraulic cylinders communicate with one or more cylinder rods that are removably attached to the receivers, the cylinder rods being disconnected from the receivers during the conversion step.

18. The method of claim 15, wherein the alternate towing apparatus comprises frame fork holders.

19. The method of claim 15, wherein the step of conversion is accomplished by removing the receivers from the cross bar.

20. The method of claim 15, wherein the wheel lift apparatus comprises a self-loading wheel lift.

* * * * *